(12) United States Patent
Dong et al.

(10) Patent No.: US 10,332,013 B2
(45) Date of Patent: Jun. 25, 2019

(54) SYSTEM AND METHOD FOR RECOMMENDING APPLICATIONS BASED ON HISTORICAL USAGE

(71) Applicant: Huawei Technologies Co., Ltd., Shenzhen (CN)

(72) Inventors: Zhenhua Dong, Shenzhen (CN); Xiuqiang He, Shenzhen (CN); Gong Zhang, Shenzhen (CN); Guoxiang Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 14/977,991

(22) Filed: Dec. 22, 2015

(65) Prior Publication Data
US 2016/0110649 A1 Apr. 21, 2016

Related U.S. Application Data

(63) Continuation of application No. PCT/CN2014/083101, filed on Jul. 28, 2014.

(30) Foreign Application Priority Data

Feb. 28, 2014 (CN) .......................... 2014 1 0073562

(51) Int. Cl.
*G06N 5/04* (2006.01)
*H04W 4/50* (2018.01)
(Continued)

(52) U.S. Cl.
CPC ....... *G06N 5/046* (2013.01); *G06F 16/24575* (2019.01); *G06N 20/00* (2019.01); *H04W 4/50* (2018.02); *G06F 16/9535* (2019.01)

(58) Field of Classification Search
None
See application file for complete search history.

(56) References Cited

U.S. PATENT DOCUMENTS 8,452,797 B1   5/2013  Paleja et al.
8,817,956 B2 *  8/2014  Yang ................... H04L 65/1036
                                                    379/93.01
(Continued)

FOREIGN PATENT DOCUMENTS

CN       103116594 A      5/2013
CN       103136324 A      6/2013
(Continued)

OTHER PUBLICATIONS

Shin, C., et al., "Understanding and Prediction of Mobile Application Usage for Smart Phones," UbiComp, Sep. 5-8, 2012, pp. 173-182.
(Continued)

*Primary Examiner* — Li Wu Chang
(74) *Attorney, Agent, or Firm* — Conley Rose, P.C.

(57) ABSTRACT

An application program recommending method may include acquiring current context information of the terminal, acquiring an amount of context information generated when the terminal runs a first application program, where the first application program refers to an application program stored in the terminal, determining a to-be-used recommending mechanism according to the amount of the context information generated when the terminal runs the first application program, and determining, according to the to-be-used recommending mechanism, a second application program corresponding to the current context information, where the second application program refers to a to-be-recommended application program; and displaying the second application program. In this way, accuracy of predicting an application program to be used by a user is improved. Moreover, when (Continued)

historical information of using an application program by the user is insufficient, a to-be-recommended application program can also be accurately determined.

10 Claims, 7 Drawing Sheets

(51) Int. Cl.
    *G06N 20/00*         (2019.01)
    *G06F 16/2457*    (2019.01)
    *G06F 16/9535*    (2019.01)

(56) References Cited

U.S. PATENT DOCUMENTS

| | | | |
|---|---|---|---|
| 2008/0134042 A1* | 6/2008 | Jankovich | G06F 8/00 715/733 |
| 2012/0072283 A1 | 3/2012 | Devore et al. | |
| 2012/0143791 A1 | 6/2012 | Sathish et al. | |
| 2012/0166377 A1 | 6/2012 | Sathish et al. | |
| 2012/0254768 A1 | 10/2012 | Aggarwal et al. | |
| 2013/0132896 A1 | 5/2013 | Lee et al. | |
| 2013/0268396 A1 | 10/2013 | Agevik et al. | |
| 2017/0193235 A1* | 7/2017 | Li | G06F 21/602 |

FOREIGN PATENT DOCUMENTS

| | | |
|---|---|---|
| CN | 103327102 A | 9/2013 |
| WO | 2013034943 A1 | 3/2013 |

OTHER PUBLICATIONS

Foreign Communication From A Counterpart Application, PCT Application No. PCT/CN2014/083101, English Translation of International Search Report dated Feb. 25, 2015, 2 pages.

Foreign Communication From A Counterpart Application, PCT Application No. PCT/CN2014/083101, English Translation of Written Opinion dated Feb. 25, 2015, 3 pages.

Machine Translation and Abstract of Chinese Publication No. CN103327102, Sep. 25, 2013, 27 pages.

Foreign Communication From A Counterpart Application, Chinese Application No. 201410073562.9, Chinese Office Action dated Oct. 10, 2017, 5 pages.

* cited by examiner

SYSTEM AND METHOD FOR RECOMMENDING APPLICATIONS BASED ON HISTORICAL USAGE

CROSS-REFERENCE TO RELATED APPLICATIONS

This application is a continuation of International Application No. PCT/CN2014/083101, filed on Jul. 28, 2014, which claims priority to Chinese Patent Application No. 201410073562.9, filed on Feb. 28, 2014, both of which are hereby incorporated by reference in their entireties.

TECHNICAL FIELD

Embodiments of the present disclosure relate to the field of communications technologies, and in particular, to an application program recommending method and a terminal.

BACKGROUND

With popularization of terminals, application programs developed for terminals increase. A user may freely download and install various application programs in a terminal. When facing a large quantity of application programs, the user needs to quickly select an interesting application program from these application programs.

In the prior art, a use model of an application program is established according to historical information of use of application programs by a user, an application program recommended for the user is determined according to current context information and the established use model of an application program, and then a list is generated and recommended to the user. Then the user selects an interesting application program from the list.

However, in the prior art, a large amount of historical information of use of application programs by a user is needed to establish a use model. When a user starts to use an application program, a larger amount of historical information cannot be provided for establishing a use model.

SUMMARY

The present disclosure provides an application program recommending method and a terminal, so that an application program can be accurately recommended to a user when the user starts to use an application program.

According to a first aspect, an embodiment of the present disclosure provides an application program recommending method, including acquiring current context information of a terminal; acquiring an amount of context information generated when the terminal runs a first application program, where the first application program refers to an application program stored in the terminal; determining a to-be-used recommending mechanism according to the amount of the context information generated when the terminal runs the first application program and determining, according to the to-be-used recommending mechanism, a second application program corresponding to the current context information, where the second application program refers to a to-be-recommended application program; and displaying the second application program.

In a first possible implementation manner of the first aspect, the recommending mechanism includes at least one of a use rule and a use model; and the determining a to-be-used recommending mechanism according to the amount of the context information generated when the terminal runs the first application program and determining, according to the to-be-used recommending mechanism, a second application program corresponding to the current context information includes, if the amount of the context information generated when the terminal runs the first application program is less than or equal to a first preset value, determining, according to the use rule, a to-be-recommended application program corresponding to the current context information; if the amount of the context information generated when the terminal runs the first application program is greater than or equal to a second preset value, determining, according to the use model, a to-be-recommended application program corresponding to the current context information; and if the amount of the context information generated when the terminal runs the first application program is greater than the first preset value and less than the second preset value, determining, according to the use rule and the use model, a to-be-recommended application program corresponding to the current context information.

With reference to the first possible implementation manner of the first aspect, in a second possible implementation manner of the first aspect, before the determining a to-be-used recommending mechanism according to the amount of the context information generated when the terminal runs the first application program, the method further includes acquiring the context information generated when the terminal runs the first application program; and generating the use rule and the use model according to the context information generated when the terminal runs the first application program.

With reference to the second possible implementation manner of the first aspect, in a third possible implementation manner of the first aspect, the generating the use rule and the use model according to the context information generated when the terminal runs the first application program includes extracting a context information characteristic value of the first application program according to the context information generated when the terminal runs the first application program; and generating the use rule and the use model according to the context information characteristic value of the first application program.

With reference to the third possible implementation manner of the first aspect, in a fourth possible implementation manner of the first aspect, the generating the use rule and the use model according to the context information characteristic value of the first application program includes determining, according to the context information characteristic value of the first application program, a priority recommended for the second application program under a preset condition; using the priority recommended for the second application program under the preset condition as the use rule; and generating the use model according to the context information characteristic value of the first application program using a machine training method.

With reference to the first possible implementation manner of the first aspect or the second possible implementation manner of the first aspect or the third possible implementation manner of the first aspect or the fourth possible implementation manner of the first aspect, in a fifth possible implementation manner of the first aspect, after the displaying the second application program, the method further includes acquiring feedback information of the second application program; and updating the use rule and the use model according to the feedback information of the second application program.

With reference to the fifth possible implementation manner of the first aspect, in a sixth possible implementation manner of the first aspect, the feedback information includes use time and use duration.

According to a second aspect, an embodiment of the present disclosure provides a terminal, including an acquiring unit configured to acquire current context information of the terminal, and acquire an amount of context information generated when the terminal runs a first application program, where the first application program refers to an application program stored in the terminal; a determining unit configured to determine a to-be-used recommending mechanism according to the amount, acquired by the acquiring unit, of the context information generated when the terminal runs the first application program, and determine, according to the to-be-used recommending mechanism, a second application program corresponding to the current context information acquired by the acquiring unit, where the second application program refers to a to-be-recommended application program; and a displaying unit configured to display the second application program determined by the determining unit.

With reference to the second aspect, in a first possible implementation manner of the second aspect, the recommending mechanism determined by the determining unit includes at least one of a use rule and a use model; and the determining unit is further configured to, if the amount, acquired by the acquiring unit, of the context information generated when the terminal runs the first application program is less than or equal to a first preset value, determine, according to the use rule, a to-be-recommended application program corresponding to the current context information acquired by the acquiring unit; if the amount, acquired by the acquiring unit, of the context information generated when the terminal runs the first application program is greater than or equal to a second preset value, determine, according to the use model, a to-be-recommended application program corresponding to the current context information acquired by the acquiring unit; and if the amount, acquired by the acquiring unit, of the context information generated when the terminal runs the first application program is greater than the first preset value and less than the second preset value, determine, according to the use rule and the use model, a to-be-recommended application program corresponding to the current context information acquired by the acquiring unit.

With reference to the first possible implementation manner of the second aspect, in a second possible implementation manner of the second aspect, the terminal further includes a generating unit, where the acquiring unit is further configured to acquire the context information generated when the terminal runs the first application program; and the generating unit is configured to generate the use rule and the use model according to the context information that is generated when the terminal runs the first application program and is acquired by the acquiring unit.

With reference to the second possible implementation manner of the second aspect, in a third possible implementation manner of the second aspect, the generating unit is further configured to extract a context information characteristic value of the first application program according to the context information generated when the terminal runs the first application program; and generate the use rule and the use model according to the context information characteristic value of the first application program.

With reference to the third possible implementation manner of the second aspect, in a fourth possible implementation manner of the second aspect, the generating unit is further configured to determine, according to the context information characteristic value of the first application program, a priority recommended for the second application program under a preset condition; use the priority recommended for the second application program under the preset condition as the use rule; and generate the use model according to the context information characteristic value of the first application program using a machine training method.

With reference to the first possible implementation manner of the second aspect or the second possible implementation manner of the second aspect or the third possible implementation manner of the second aspect or the fourth possible implementation manner of the second aspect, in a fifth possible implementation manner of the second aspect, the terminal further includes an updating unit, where the acquiring unit is further configured to acquire feedback information of the second application program displayed by the displaying unit; and the updating unit is configured to update the use rule and the use model according to the feedback information that is of the second application program and that is acquired by the acquiring unit.

With reference to the fifth possible implementation manner of the second aspect, in a sixth possible implementation manner of the second aspect, the feedback information includes use time and use duration.

According to the application program recommending method and the terminal that are provided in embodiments of the present disclosure, current context information of the terminal is acquired, and an amount of context information generated when the terminal runs a first application program is acquired, where the first application program refers to an application program stored in the terminal; then a to-be-used recommending mechanism is determined according to the amount of the context information generated when the terminal runs the first application program, and a second application program corresponding to the current context information is determined according to the to-be-used recommending mechanism, where the second application program refers to a to-be-recommended application program; and the second application program is displayed. In this way, accuracy of predicting an application program to be used by a user is improved. Moreover, when historical information of using an application program by the user is insufficient, a to-be-recommended application program can also be accurately determined, which improves user experience.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
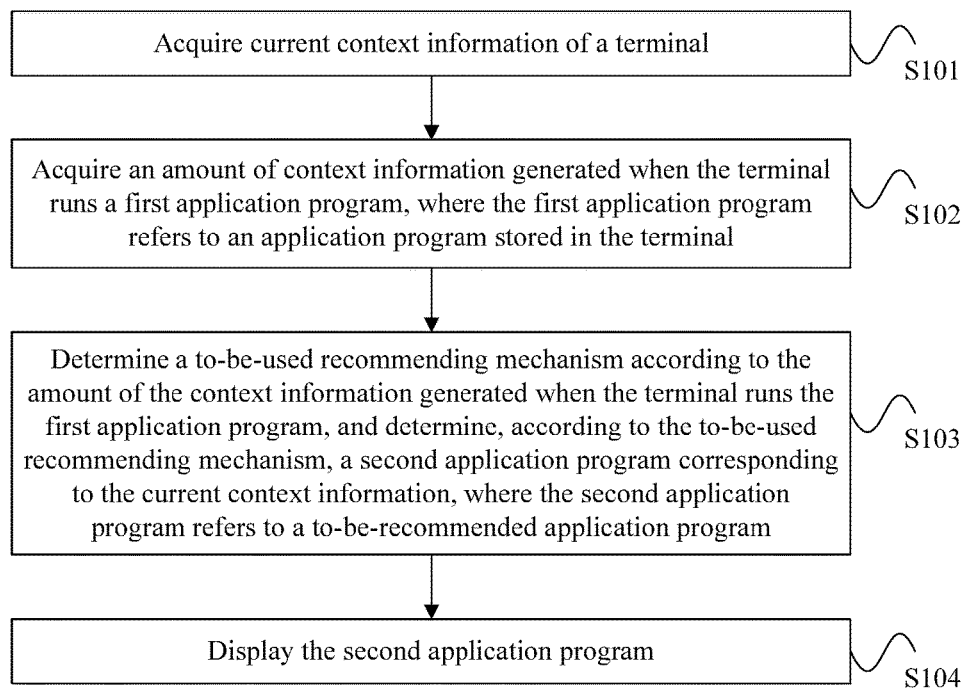
FIG. 1 is a flowchart of an first embodiment of an application program recommending method according to the present disclosure.

FIG. 1 is a flowchart of an embodiment of an application program recommending method according to the present disclosure. As shown in FIG. 1, this embodiment may be executed by a terminal, or may be executed by a server that communicates with the terminal, which is not limited. The method in this embodiment may include:

Step S101. Acquire current context information of the terminal.

Step S102. Acquire an amount of context information generated when the terminal runs a first application program, where the first application program refers to an application program stored in the terminal.

Step S103. Determine a to-be-used recommending mechanism according to the amount of the context information generated when the terminal runs the first application program, and determine, according to the to-be-used recommending mechanism, a second application program corresponding to the current context information, where the second application program refers to a to-be-recommended application program.

Step S104. Display the second application program.

In this embodiment, the current context information of the terminal is acquired. For example, the current context information may include information acquired by a sensor. The information acquired by the sensor is referred to as sensor information and use information of an application program. The sensor information includes but is not limited to the following information: Global Positioning System (GPS) sensor information, acceleration sensor information, orientation sensor information, time sensor information, and the like. Therefore, the current context information may indicate information about a geographical location in which the terminal currently locates, time information, and whether the terminal is in a moving state or a static state. The current context information may further indicate whether the terminal is in a fast moving state (for example, riding on a vehicle) or in a slow moving state (for example, walking). If a current user is using an application program in the terminal, the current context information may include use information of the application program, for example, an identifier of the application program that is being used, start time of using the application program, current duration of using the application program, and the like. The current context information may further include but is not limited to the following information: call information, short message service (SMS) message information, network connection information, and the like.

The current context information of the terminal may be acquired when the terminal is powered on, the current context information of the terminal may be acquired when the user unlocks the terminal, the current context information of the terminal may also be acquired at each preset time node, and the current context information of the terminal may also be acquired according to a preset gesture of a user operation, which is not limited in this embodiment of the present disclosure.

The amount of the context information generated when the terminal runs the first application program may be further acquired, where the context information may be sensor information and use information of the first application program when the terminal runs the first application program. When the terminal runs "Sina Weibo", running time and running duration of "Sina Weibo", a geographical location in which the terminal locates, acceleration information of the terminal, whether the terminal is in a call, whether the terminal sends an SMS message, and the like may be acquired. If the terminal runs an application program, for example, "Sina Weibo", for the first time in the morning of January 1, context information generated when the terminal runs "Sina Weibo" at this moment may be acquired, and in this case, the amount of the context information generated when the terminal runs an application program is 1. If the terminal runs "Moji Weather" in the afternoon of January 1, context information generated when the terminal runs "Moji Weather" at this moment may be acquired, and in this case, the amount of the context information generated when the terminal runs an application program is 2. If the terminal runs "Sina Weibo" in the morning of January 2, context information generated when the terminal runs "Sina Weibo" at this moment may be acquired, and in this case, the amount of context information generated when the terminal runs an application program is 3. If the terminal runs "Moji Weather" in the afternoon of January 2, context information generated when the terminal runs "Moji Weather" at this moment may be acquired, and in this case, the amount of the context information generated when the terminal runs an application program is 4, and so on. Therefore, the amount of the context information generated when the terminal runs the first application program may be acquired.

After the amount of the context information generated when the terminal runs the first application program is acquired, the to-be-used recommending mechanism of an application program is determined according to the amount, and then the second application program corresponding to the current context information is determined according to the to-be-used recommending mechanism. For example, when the amount of the context information generated when the terminal runs the first application program is relatively small, it may be determined that the to-be-used recommending mechanism of an application program may be an application program use rule preset by the user. If the current context information indicates that current time is 7:30, and the preset application program use rule may indicate that application programs to be recommended to the user during 7:00 and 8:00 are "Headlines Today", "Sina Weibo", and "Moji Weather", it may be determined that the second application program includes: "Headlines Today", "Sina Weibo", and "Moji Weather".

Optionally, the recommending mechanism includes at least one of a use rule and a use model.

The determining a to-be-used recommending mechanism according to the amount of the context information generated when the terminal runs the first application program, and determining, according to the to-be-used recommending mechanism, a second application program corresponding to the current context information includes, if the amount of the context information generated when the terminal runs the first application program is less than or equal to a first preset value, determining, according to the use rule, a to-be-recommended application program corresponding to the current context information; if the amount of the context information generated when the terminal runs the first application program is greater than or equal to a second preset value, determining, according to the use model, a to-be-recommended application program corresponding to the current context information; and if the amount of the context information generated when the terminal runs the first application program is greater than the first preset value and less than the second preset value, determining, according to the use rule and the use model, a to-be-recommended application program corresponding to the current context information. Further, the application program corresponding to the current context information is determined according to the use rule; the application program corresponding to the current context information is determine according to the use model; the application program determined according to the use rule and the application program determined according to the use model are both used as to-be-recommended application programs corresponding to the current context information; or a same application program in application program determined according to the use rule and the application program determined according to the use model is used as the to-be-recommended application program corresponding to the current context information.

It should be noted that, the first preset value and the second preset value may be determined according to an actual application scenario, which is not limited herein.

For example, if the amount of the context information generated when the terminal runs the first application program is less than or equal to the first preset value, and if the user just starts to use an application program in the terminal, the to-be-recommended application program corresponding to the current context information may be determined according to the use rule. If the use rule indicates that the user preferably uses "Headlines Today", "Sina Weibo", and "Moji Weather" in a case of the current context information, it is determined that "Headlines Today", "Sina Weibo", and "Moji Weather" are currently to be recommended. Therefore, when historical information of using an application program by the user is insufficient to establish a use model, a to-be-recommended application program can also be determined.

For example, if the amount of the context information generated when the terminal runs the first application program is greater than the first preset value and less than the second preset value, and if the user has used the application program in the terminal for a period of time, the to-be-recommended application program corresponding to the current context information may be determined according to the use rule and the use model. If the use rule indicates that the user preferably uses "Headlines Today", "Sina Weibo", and "Moji Weather" in a case of the current context information, and if the use model indicates that the user preferably uses "Sina Weibo", "Moji Weather", and "Headlines Today" in a case of the current context information, it is determined that "Sina Weibo" and "Moji Weather" are currently recommended; or, it is determined that "Sina Weibo", "Moji Weather", "Headlines Today", and "Gmail" (a free Internet mail service provided by Google) are currently recommended. Therefore, determining the to-be-recommended application program according to the use rule and the use model can improve accuracy of predicting an application program.

For example, if the amount of the context information generated when the terminal runs the first application program is greater than or equal to the second preset value, and if the user has used an application program in the terminal for a long time, the to-be-recommended application program corresponding to the current context information may be determined according to the use model. If the use model indicates that the user preferably uses "Sina Weibo", "Moji Weather", and "Headlines Today" in a case of the current context information, it is determined that "Sina Weibo", "Moji Weather", and "Headlines Today" are currently to be recommended.

After the foregoing to-be-recommended second application program is determined, the foregoing to-be-recommended second application program may be displayed. For example, an identifier (for example, an icon) of the to-be-recommended application program is displayed on a display screen of the terminal; the foregoing to-be-recommended application program may be displayed in a list manner, or the foregoing to-be-recommended application program may be displayed in an icon (a format of an icon) tiling manner. Therefore, the user may select, from the foregoing displayed to-be-recommended application program, an interesting application program for operations.

In the application program recommending method provided in the embodiment of FIG. 1, current context information of a terminal is acquired, and an amount of context information generated when the terminal runs a first application program is acquired, where the first application program refers to an application program stored in the terminal; then a to-be-used recommending mechanism is determined according to the amount of the context information generated when the terminal runs the first application program, and a second application program corresponding to the current context information is determined according to the to-be-used recommending mechanism, where the second application program refers to a to-be-recommended application program; and the second application program is displayed. In this way, accuracy of predicting an application program to be used by a user is improved. Moreover, when historical information of using an application program by the user is insufficient, a to-be-recommended application program can also be accurately determined, which improves user experience.

Figure 2:
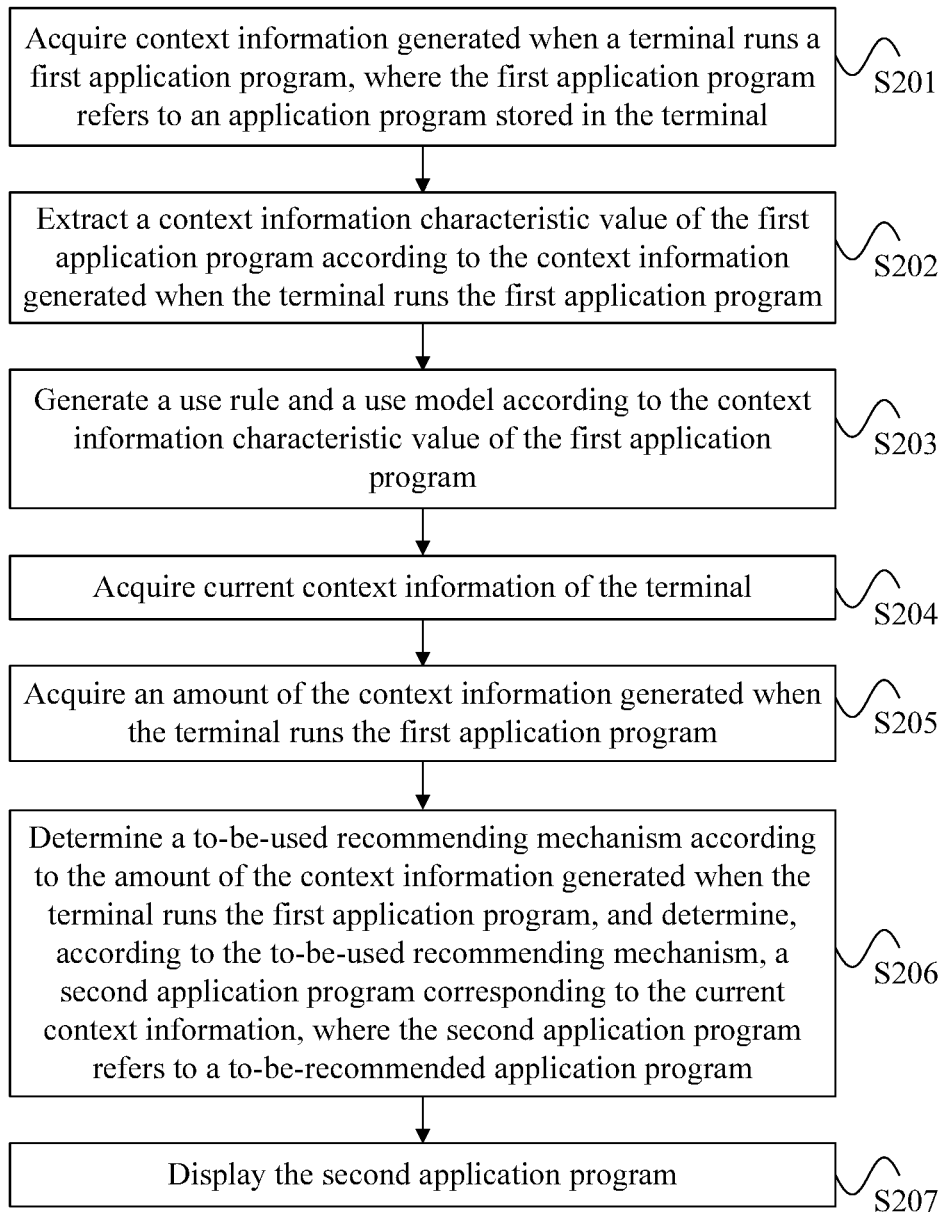
FIG. 2 is a flowchart of an embodiment of an application program recommending method according to the present disclosure.

FIG. 2 is a flowchart of an embodiment of an application program recommending method according to the present disclosure. As shown in FIG. 2, this embodiment may be executed by a terminal, or may be executed by a server that communicates with the terminal, which is not limited. The method in this embodiment may include:

Step S201. Acquire context information generated when the terminal runs a first application program, where the first application program refers to an application program stored in the terminal.

In this embodiment, the context information generated when the terminal runs the first application program may be acquired, for example, use information and sensor information, of an application program, generated when the terminal runs the application program may be acquired. If the terminal runs "Sina Weibo", time, duration, a geographical location, acceleration information, whether the terminal is in a call, whether the terminal sends an SMS message, and the like generated when the terminal runs "Sina Weibo" may be acquired.

Acceleration information is used as an example for description: Acceleration information at a moment is acquired, and each piece of acceleration information may be represented as a four-tuples <time, x-axis acceleration, y-axis acceleration, z-axis acceleration>. It should be noted that, there may be multiple representation forms of the acceleration information, which include but are not limited to the foregoing example, and the foregoing example merely lists a tuple-based representation manner.

After the context information generated when the terminal runs the first application program is acquired, a use rule and a use model may be generated according to the context information generated when the terminal runs the first application program, which may include S202 and S203.

Step S202. Extract a context information characteristic value of the first application program according to the context information generated when the terminal runs the first application program.

In this embodiment, the context information characteristic value, of the first application program, generated when the terminal runs the first application program may be extracted according to the context information generated when the terminal runs the first application program. The context information characteristic value of the first application program may include an identifier (for example, name) of the first application program and a characteristic value. The context information characteristic value of the first application program is as follow:

application 1 characteristic 1: value 1 characteristic 2: value 2 . . . characteristic n: value n application 2 characteristic 1: value 1 characteristic 2: value 2 . . . characteristic n: value n application m characteristic 1: value 1 characteristic 2: value 2 . . . characteristic n: value n For example, characteristic: value may be: time: 7:00 to 8:00, or day of a week: Wednesday, or acceleration: a value, or whether the terminal is in a call: yes or no, or whether the terminal sends an SMS message: yes or no.

The following uses acceleration information in the acquired context information generated when the terminal runs the first application program as an example to describe how to extract a characteristic value. The acceleration information may be analyzed. Characteristic values such as an acceleration average value, variance, and a Fourier transform sum during a period of time of running the application program by the user are extracted as follows:

<x-axis acceleration average value, x-axis acceleration variance, x-axis acceleration maximum value, x-axis acceleration minimum value, x-axis acceleration Fourier transform sum, y-axis acceleration average value, y-axis acceleration variance, y-axis acceleration maximum value, y-axis acceleration minimum value, y-axis acceleration Fourier transform sum, z-axis acceleration average value, z-axis acceleration variance, z-axis acceleration maximum value, z-axis acceleration minimum value, and z-axis acceleration Fourier transform sum>.

Step S203. Generate a use rule and a use model according to the context information characteristic value of the first application program.

In this embodiment, the use model may be generated according to the context information characteristic value of the first application program using a machine training and learning method, and further, a generated use model may be stored. For example, a use model library may be established, and a use model generated each time may be stored in the use model library. The machine training method may include a Bayes model, a linear regression model, a decision tree model, an artificial neural network model, or the like, which is not limited in this embodiment of the present disclosure. In this embodiment, that the machine training method is the Bayes model is used as an example for description:

(1) Calculating a prior probability of each application, for example:

application 1 probability value 1 application 2 probability value 2 . . .

application m probability m (2) Calculating a conditional probability corresponding to each characteristic value, for example:

characteristic value 1 probability value 1 characteristic value 2 probability value 2 characteristic value 3 probability value 3 . . .

characteristic value n probability value n

In this embodiment, the use rule may be generated according to the context information characteristic value of the application program by selecting a rule generating method, and further, a generated use rule may be stored. For example, a use rule library may be established, and a use rule generated each time may be stored in the use rule library. In a feasible implementation manner, a priority recommended for a second application program under a preset condition is determined according to the context information characteristic value of the first application program; the priority recommended for the second application program under the preset condition is used as the use rule; that the preset condition is a time statistical rule is used as an example in the following to describe a use rule generating process:

Assuming that a use probability of "Sina Weibo" between 7:00 and 8:00 by the user is 68 percent (%), a use probability of "Moji Weather" between 7:00 and 8:00 by the user is 15%, and a use probability of "Gmail" between 7:00 and 8:00 by the user is 5%, then a recommending priority of the application programs is that "Sina Weibo">"Moji Weather">"Gmail". Therefore, the generated use rule is that the first three application programs recommended to be used between 7:00 and 8:00 are "Sina Weibo", "Moji Weather", and "Gmail".

Step S204. Acquire current context information of the terminal.

In this embodiment, a specific implementation process of S204 is similar to a implementation process of S101 in the method embodiment of FIG. 1 of the present disclosure. For details, reference may be made to relevant records in the foregoing method embodiment of the present disclosure, and details are not described herein again. After acquiring the current context information of the terminal, the terminal may determine the second application program corresponding to the current context information.

How the terminal determines the second application program corresponding to the current context information may be implemented using S205 and S206.

Step S205. Acquire an amount of the context information generated when the terminal runs the first application program.

In this embodiment, the amount of the context information that is generated when the terminal runs the first application program and that is acquired in S201 may be acquired. A specific implementation process is similar to a specific implementation process of S102 in the method embodiment of FIG. 1 of the present disclosure. For details, reference may be made to relevant records in the foregoing method embodiment of the present disclosure, and details are not described herein again.

Step S206. Determine a to-be-used recommending mechanism according to the amount of the context information generated when the terminal runs the first application program, and determine, according to the to-be-used recommending mechanism, a second application program corresponding to the current context information, where the second application program refers to a to-be-recommended application program.

In this embodiment, the amount of the context information that is generated when the terminal runs the first application program and that is acquired in S201 may be acquired. A specific implementation process is similar to a implementation process of S103 in the method embodiment of FIG. 1 of the present disclosure. For details, reference may be made to relevant records in the foregoing method embodiment of the present disclosure, and details are not described herein again.

In an alternative implementation manner, the specific implementation process of S206 may be as follows: After the current context information of the terminal is acquired, the context information characteristic value is extracted according to the current context information; the to-be-used recommending mechanism is determined according to the amount of the context information generated when the terminal runs the first application program, and the second application program corresponding to the context information characteristic value is determined according to the to-be-used recommending mechanism, where the second application program refers to a to-be-recommended application program.

The current context information characteristic value is extracted according to the current context information, where the current context information characteristic value may be, for example, time: 7:00 to 8:00, day of a week: Wednesday, whether the terminal is in a call: yes, or whether the terminal sends an SMS message: no.

In this embodiment, if the amount that is of the context information generated when the terminal runs the first application program and that is acquired in S205 is less than or equal to a first preset value, it is determined that the recommending mechanism is the use rule, and then the to-be-recommended second application program corresponding to the current context information characteristic value is determined according to the use rule. For example, if context information generated when the user uses an application program is acquired 10 times, it is not suitable to use the use model to determine the to-be-recommended second application program corresponding to the current context information characteristic value.

If the amount that is of the context information generated when the terminal runs the first application program and that is acquired in S205 is greater than or equal to a second preset value, it is determine that the recommending mechanism is the use rule, and then the to-be-recommended second application program corresponding to the current context information characteristic value is determined according to the use model. For example, context information generated when the user uses an application program is acquired 100 times, and then at least one to-be-recommended application program corresponding to the current context information characteristic value is determined using the use model.

If the amount that is of the context information generated when the terminal runs the first application program and that is acquired in S205 is greater than the first preset value and less than the second preset value, the to-be-recommended application program corresponding to the current context information characteristic value is determined according to the use rule and the use model. For example, context information generated when the user uses an application program is acquired 50 times, and then the to-be-recommended second application program corresponding to the current context information characteristic value may be determined using the use model and the use rule. The application program corresponding to the current context information characteristic value is determined according to the use rule; the application program corresponding to the current context information characteristic value is determined according to the use model; the application program determined according to the use rule and the application program determined according to the use model are both used as to-be-recommended application programs corresponding to the current context information characteristic value; or a same application program in the application program determined according to the use rule and the application program determined according to the use model is used as the to-be-recommended application program corresponding to the current context information characteristic value. For example, the application programs that correspond to the current context information characteristic value and are determined according to the use rule are "Sina Weibo", "Moji Weather", and "Gmail", the application programs that correspond to the current context information characteristic value and are determined according to the use rule are "Headlines Today", "Sina Weibo", and "Moji Weather". Then finally determined to-be-recommended application programs are "Sina Weibo" and "Moji Weather"; or the finally determined to-be-recommended application programs are "Sina Weibo", "Moji Weather", "Gmail", and "Headlines Today".

S207. Display the second application program.

In this embodiment, a specific implementation process of S207 is similar to a specific implementation process of S104 in the method embodiment of FIG. 1 of the present disclosure. For details, reference may be made to relevant records in the foregoing method embodiment of the present disclosure, and details are not described herein again.

In this embodiment, context information generated when a terminal runs a first application program is acquired, where the first application program refers to an application program stored in the terminal; a context information characteristic value of the first application program is extracted according to the context information generated when the terminal runs the first application program; then a use rule and a use model are generated according to the context information characteristic value of the first application program; then a to-be-used recommending mechanism is determined according to an amount of the context information generated when the terminal runs the first application program; and a second application program corresponding to current context information is determined according to the to-be-used recommending mechanism, where the second application program refers to a to-be-recommended application program. In this way, accuracy of predicting an application program to be used by a user is improved. Moreover, when historical information of using an application program by the user is insufficient to establish a use model, a to-be-recommended application program can be determined according to a use rule, which improves user experience.

Figure 3:
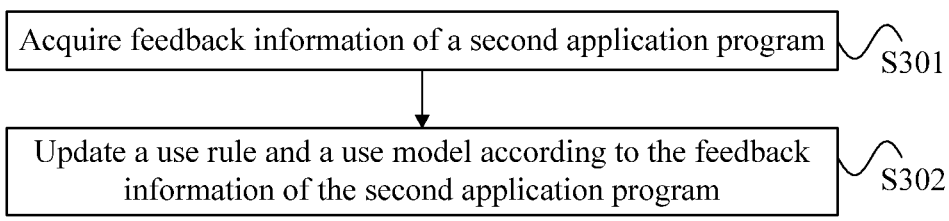
FIG. 3 is a flowchart of an embodiment of an application program recommending method according to the present disclosure.

FIG. 3 is a flowchart of an embodiment of an application program recommending method according to the present disclosure. As shown in FIG. 3, on a basis of the method embodiment shown in FIG. 2, further, the method in this embodiment may further include:

Step S301. Acquire feedback information of the second application program.

In this embodiment, after the foregoing second application program is displayed, the feedback information of the second application program may be further acquired. In a feasible implementation manner, the feedback information of the second application program may include use time and use duration of the second application program, for example, recommended application programs are "Sina Weibo", "Moji Weather", and "Gmail". If the user uses "Sina Weibo" according to the recommended application programs, but does not use "Moji Weather" and "Gmail", the feedback information of the recommended application programs is:

"Sina Weibo": use started from 7:00, for 1 hour.

Both "Moji Weather" and "Gmail" are not used, and it may be considered that "Moji Weather" and "Gmail" have no feedback information.

Step S302. Update the use rule and the use model according to the feedback information of the second application program.

In this embodiment, after the feedback information of the second application program is acquired, the use rule and the use model may be updated according to the feedback information of the second application program, which may be updating a context information characteristic value of the second application program according to the context information generated when the terminal runs the second application program. For example, if it is found that the user often uses the recommended application program within a period of time, and a corresponding time characteristic may be added. Alternatively, the use rule and the use model may be updated according to the context information characteristic value of the second application program. For example, that the user chooses to use a recommended application program is used as a positive example, that the user does not choose to use a recommended application program is used as a negative example, and then the use rule and the use model are updated; or if the user seldom uses a recommended application program, it indicates that the current use rule and use model are not suitable for the user, and the use rule and use model may be adjusted to another use rule and use model, for example, the use rule may be adjusted using a new time statistical rule, and the use model may also be updated by changing a Bayes model to a linear regression model. Alternatively, the acquired current context information may be updated, for example, if a quantity that the user does not choose a previously recommended application program is relatively large, a type of collected current context information or a collecting frequency may be adjusted.

In a feasible implementation manner, the use rule and the use model may be adjusted according to the use time and use duration of the second application program. For example, the displayed recommended application programs are respectively "Sina Weibo", "Moji Weather", "Gmail", and "Headlines Today"; feedback information of "Sina Weibo" includes use time 9:00 and use duration 1 hour, feedback information of "Moji Weather" includes use time 9:10 and use duration 5 minutes, feedback information of "Gmail" includes use time 9:15 and use duration 20 minutes, and feedback information of "Headlines Today" includes use time 9:05 and use duration 50 minutes. Therefore, a priority recommended for the second application program under a new preset condition is adjusted according to the feedback information of the second application program under a preset condition of 9:00 to 10:00, and the recommending priority of the second application program under the new preset condition is used as a use rule; or the machine training method is adjusted from the Bayes model to the linear regression model according to the feedback information of the second application program, so as to generate a use model again.

In this embodiment, a terminal acquires feedback information of a second application program, and updates a use rule and a use model according to the feedback information of the second application program, which further improves accuracy of predicting an application program.

Figure 4:
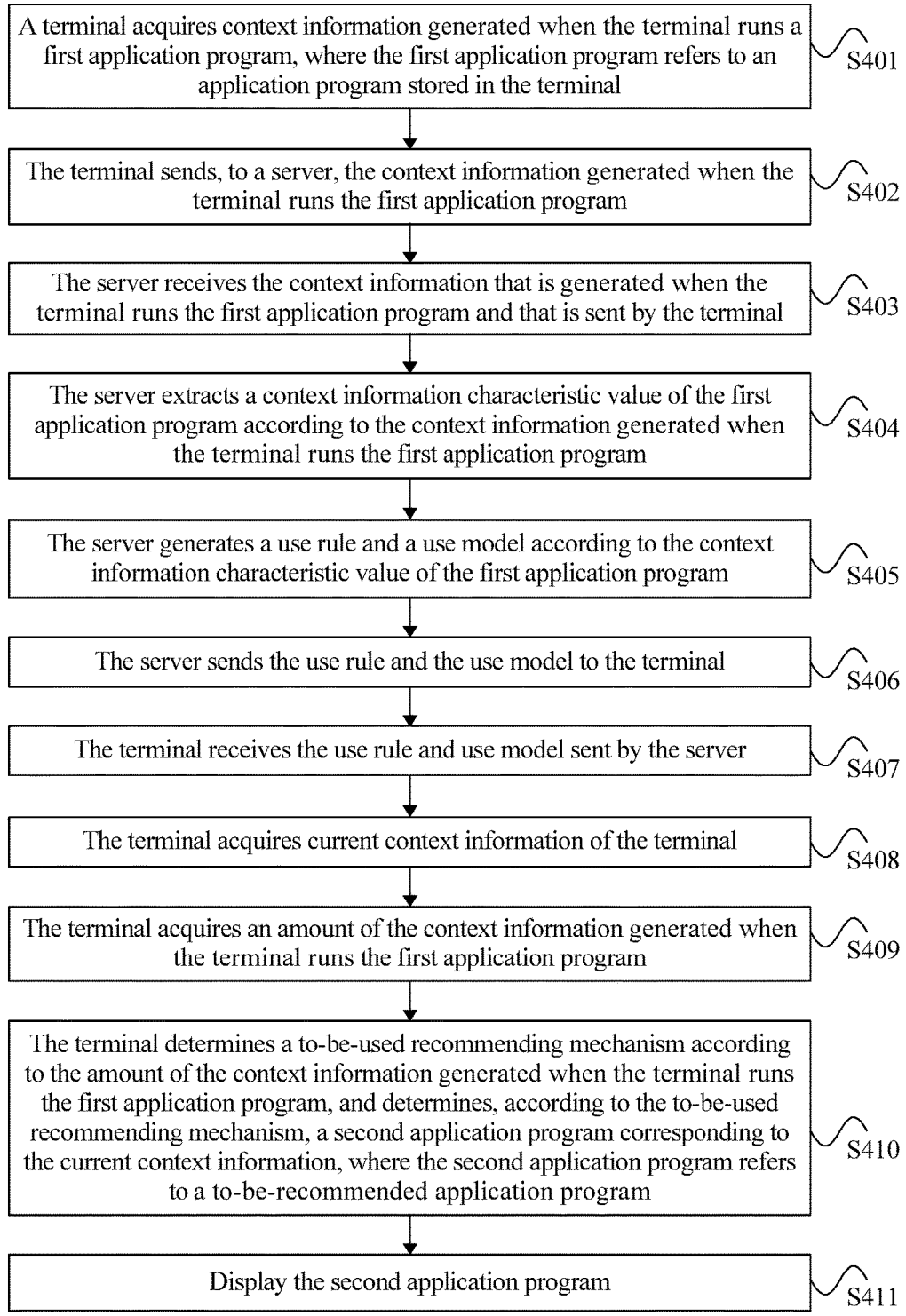
FIG. 4 is a flowchart of an embodiment of an application program recommending method according to the present disclosure.

FIG. 4 is a flowchart of an embodiment of an application program recommending method according to the present disclosure. As shown in FIG. 4, in this embodiment, a terminal determines a to-be-recommended application program corresponding to current context information of the terminal. The method in this embodiment may include:

Step S401. The terminal acquires context information generated when the terminal runs a first application program, where the first application program refers to an application program stored in the terminal.

In this embodiment, a specific implementation process of S401 is similar to a specific implementation process of S201 in the method embodiment of FIG. 2 of the present disclosure. For details, reference may be made to relevant records in the foregoing method embodiment of the present disclosure, and details are not described herein again.

Step S402. The terminal sends, to a server, the context information generated when the terminal runs the first application program.

In this embodiment, after acquiring the context information generated when the terminal runs the first application program, the terminal may send the acquired context information to the server.

Step S403. The server receives the context information that is generated when the terminal runs the first application program and is sent by the terminal.

In this embodiment, after receiving the context information that is generated when the terminal runs the first application program and is sent by the terminal, the server may generate a use rule and a use model according to the context information generated when the terminal runs the first application program, which may be S404 and S405.

Step S404. The server extracts a context information characteristic value of the first application program according to the context information generated when the terminal runs the first application program.

Step S405. The server generates a use rule and a use model according to the context information characteristic value of the first application program.

In this embodiment, a specific implementation process of S404 and S405 is similar to a specific implementation process of S202 and S203 in the method embodiment of FIG. 2 of the present disclosure. For details, reference may be made to relevant records in the foregoing method embodiment of the present disclosure, and details are not described herein again.

Step S406. The server sends the use rule and the use model to the terminal.

In this embodiment, after generating the use rule and the use model, the server may send the generated use rule and use model to the terminal.

Step S407. The terminal receives the use rule and use model sent by the server.

Step S408. The terminal acquires current context information of the terminal.

Step S409. The terminal acquires an amount of the context information generated when the terminal runs the first application program.

Step S410. The terminal determines a to-be-used recommending mechanism according to the amount of the context information generated when the terminal runs the first application program, and determines, according to the to-be-used recommending mechanism, a second application program corresponding to the current context information, where the second application program refers to a to-be-recommended application program.

Step S411. Display the second application program.

In this embodiment, a specific implementation process of S408 to S411 is similar to a specific implementation process of S204 to S207 in the method embodiment of FIG. 2 of the present disclosure. For details, reference may be made to relevant records in the foregoing method embodiment of the present disclosure, and details are not described herein again.

In this embodiment, a terminal acquires context information generated when the terminal runs a first application program, and sends, to a server, the context information generated when the terminal runs the first application program; the server generates a use model and a use rule according to the context information generated when the terminal runs the first application program and sends the use model and the use rule to the terminal; the terminal determines, according to an amount of the context information generated when the terminal runs the first application program, a to-be-used recommending mechanism, and determines, according to the to-be-used recommending mechanism, a second application program corresponding to current context information, where the second application program refers to a to-be-recommended application program. User experience is improved; in addition, accuracy of predicting an application program to be used by a user is improved. Moreover, use model and use rule generating is completed at a server end. Because a calculation capability of a server is strong, a more accurate use model and use rule can be generated, which further improves the accuracy of predicting an application program to be used by the user.

Figure 5:
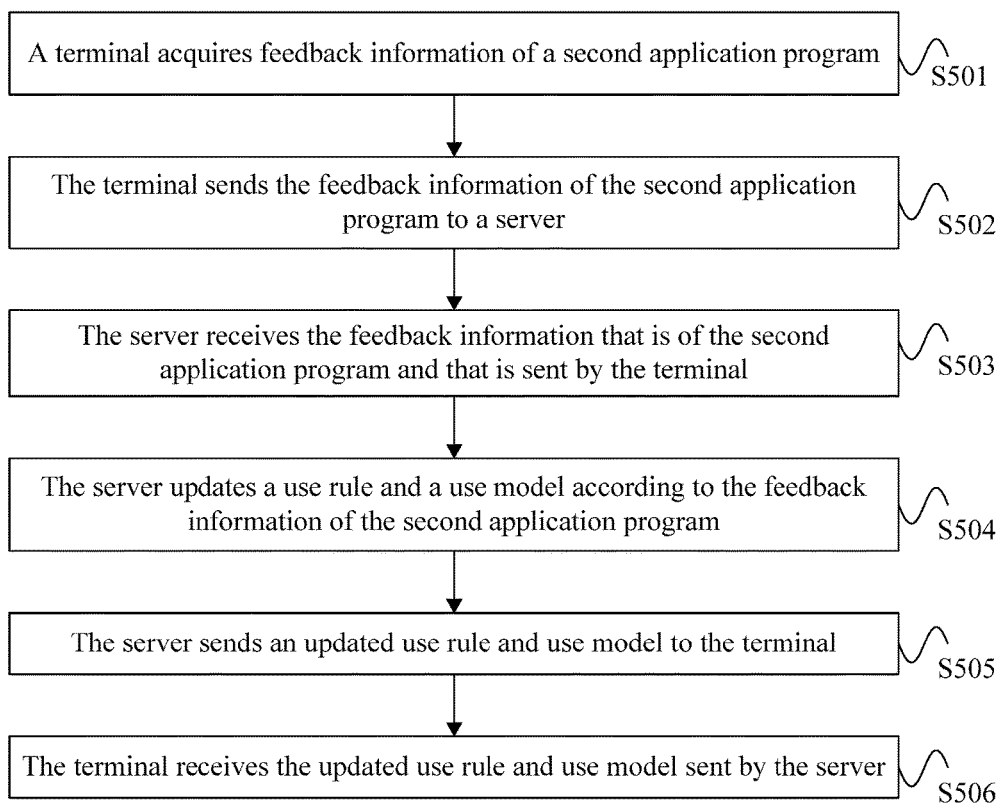
FIG. 5 is a flowchart of an embodiment of an application program recommending method according to the present disclosure.

FIG. 5 is a flowchart of an embodiment of an application program recommending method according to the present disclosure. As shown in FIG. 5, this embodiment is based on the embodiment shown in FIG. 4, and further, the method in this embodiment may include:

Step S501. The terminal acquires feedback information of the second application program.

In this embodiment, a specific implementation process of S501 is similar to a specific implementation process of S301 in the method embodiment of FIG. 3 of the present disclosure. For details, reference may be made to relevant records in the foregoing method embodiment of the present disclosure, and details are not described herein again.

Step S502. The terminal sends the feedback information of the second application program to the server.

Step S503. The server receives the feedback information that is of the second application program and is sent by the terminal.

In this embodiment, because the use rule and the use model are generated by the server, after acquiring the feedback information of the second application program, the terminal sends the feedback information of the second application program to the server; accordingly, the server receives the feedback information that is of the second application program and is sent by the terminal.

Step S504. The server updates the use rule and the use model according to the feedback information of the second application program.

In this embodiment, a specific implementation process of performing S504 by the server is similar to a specific implementation process of S302 in the method embodiment of FIG. 3 of the present disclosure. For details, reference may be made to relevant records in the foregoing method embodiment of the present disclosure, and details are not described herein again.

Step S505. The server sends an updated use rule and use model to the terminal.

Step S506. The terminal receives the updated use rule and use model sent by the server.

In this embodiment, because the second application program is determined by the terminal, after updating the use rule and the use model, the server sends the updated use rule and use model to the terminal; accordingly, the terminal receives the updated use rule and use model sent by the server, and therefore, the terminal may determine a to-be-recommended application program according to the updated use rule and/or use model.

In this embodiment, a terminal acquires feedback information of a second application program and sends the feedback information of the second application program to a server, and the server updates a use rule and a use model according to the feedback information of the second application program and sends an updated use rule and use model to the terminal, which further improves accuracy of predicting an application program.

Figure 6:
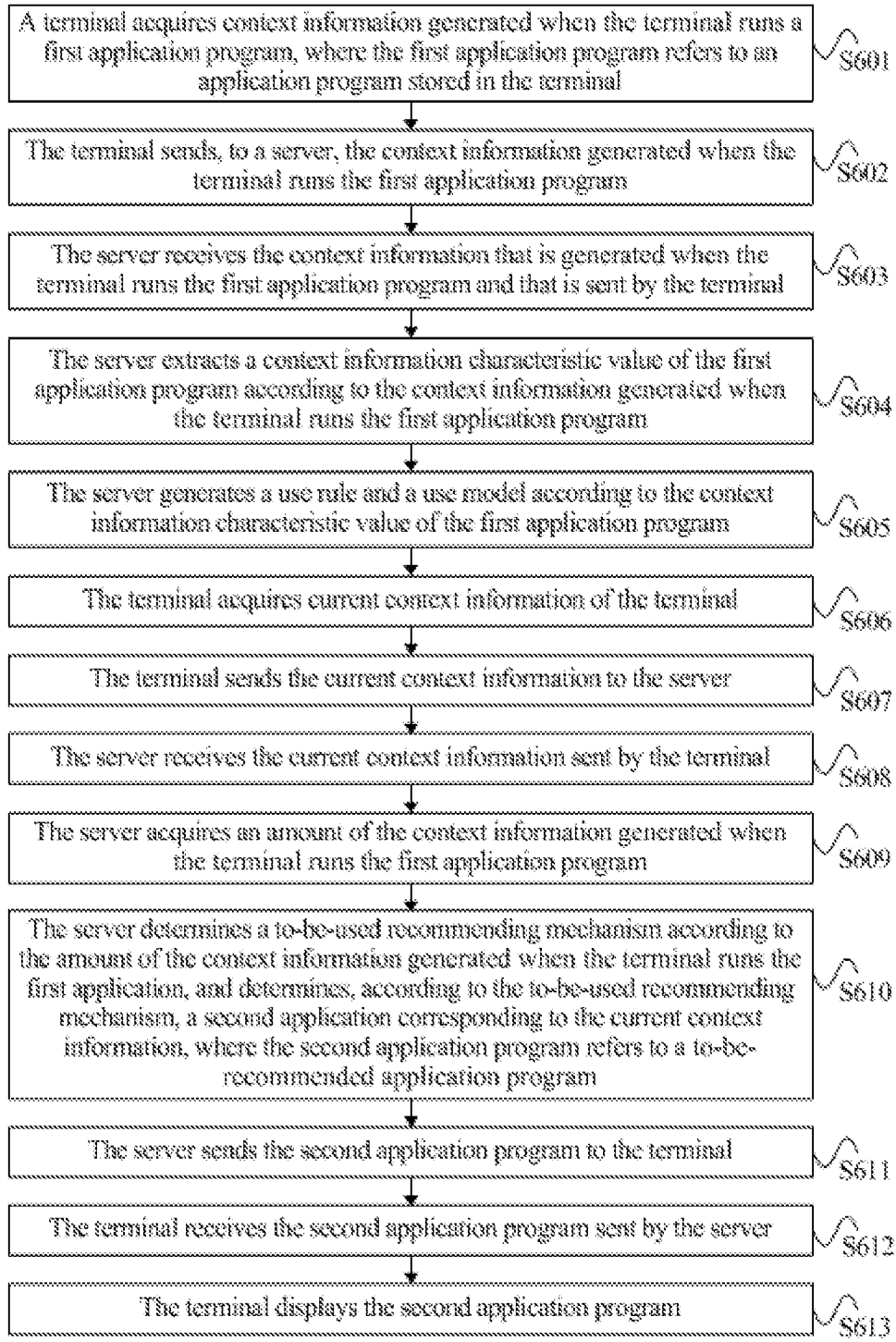
FIG. 6 is a flowchart of an embodiment of an application program recommending method according to the present disclosure.

FIG. 6 is a flowchart of an embodiment of an application program recommending method of the present disclosure. As shown in FIG. 6, in this embodiment, a server determines a to-be-recommended application program corresponding to current context information of a terminal. The method in this embodiment may include:

Step S601. The terminal acquires context information generated when the terminal runs a first application program, where the first application program refers to an application program stored in the terminal.

Step S602. The terminal sends, to the server, the context information generated when the terminal runs the first application program.

Step S603. The server receives the context information that is generated when the terminal runs the first application program and is sent by the terminal.

Step S604. The server extracts a context information characteristic value of the first application program according to the context information generated when the terminal runs the first application program.

Step S605. The server generates a use rule and a use model according to the context information characteristic value of the first application program.

In this embodiment, a specific implementation process of S601 to S605 is similar to a specific implementation process of S401 to S405 in the method embodiment of FIG. 4 of the present disclosure. For details, reference may be made to relevant records in the foregoing method embodiment of the present disclosure, and details are not described herein again.

Step S606. The terminal acquires current context information of the terminal.

In this embodiment, a specific implementation process of S606 is similar to a specific implementation process of S408 in the method embodiment of FIG. 4 of the present disclosure. For details, reference may be made to relevant records in the foregoing method embodiment of the present disclosure, and details are not described herein again.

Step S607. The terminal sends the current context information to the server.

Step S608. The server receives the current context information sent by the terminal.

In this embodiment, because the use rule and use model are generated by the server and are stored in the server, after acquiring the current context information of the terminal, the terminal sends the current context information to the server, so that the server determines a to-be-recommended application program corresponding to the current context information, which specifically includes S609 and S610.

Step S609. The server acquires an amount of the context information generated when the terminal runs the first application program.

Step S610. The server determines a to-be-used recommending mechanism according to the amount of the context information generated when the terminal runs the first application program, and determines, according to the to-be-used recommending mechanism, a second application program corresponding to the current context information, where the second application program refers to a to-be-recommended application program.

In this embodiment, a specific implementation process of S609 and S610 is similar to a specific implementation process of S409 and S410 in the method embodiment of FIG. 4 of the present disclosure. For details, reference may be made to relevant records in the foregoing method embodiment of the present disclosure, and details are not described herein again.

Step S611. The server sends the second application program to the terminal.

Step S612. The terminal receives the second application program sent by the server.

Step S613. The terminal displays the second application program.

In this embodiment, a specific implementation process of S613 is similar to a specific implementation process of S411 in the method embodiment of FIG. 4 of the present disclosure. For details, reference may be made to relevant records in the foregoing method embodiment of the present disclosure, and details are not described herein again.

In this embodiment, a terminal acquires context information generated when the terminal runs a first application program, and sends, to a server, the context information generated when the terminal runs the first application program; the server generates a use model and a use rule according to the context information generated when the terminal runs the first application program; then the terminal acquires current context information and sends the current context information to the server; and the server determines a to-be-used recommending mechanism according to an amount of the context information generated when the terminal runs the first application program, determines, according to the to-be-used recommending mechanism, a second application program corresponding to the current context information, where the second application program refers to a to-be-recommended application program, and sends the second application program to the terminal, which improves user experience. Moreover, use model and use rule generating is completed at a server end and the determining a to-be-recommended application program is also completed at the server end. Because a calculation capability of the server is strong, a more accurate use model and use rule may be generated, and a more accurate to-be-recommended application program may be determined, which further improves accuracy of predicting an application program to be used by a user.

Figure 7:
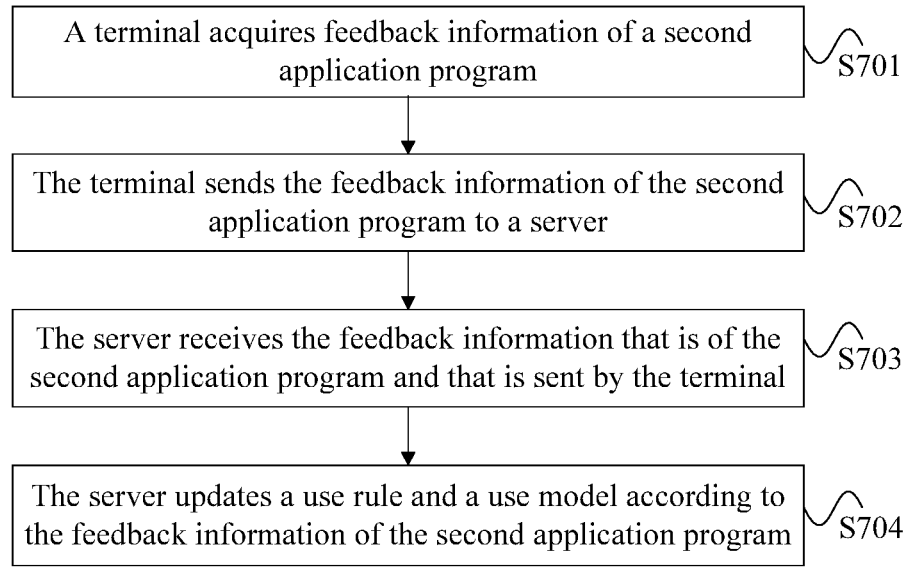
FIG. 7 is a flowchart of an embodiment of an application program recommending method according to the present disclosure.

FIG. 7 is a flowchart of an embodiment of an application program recommending method according to the present disclosure. As shown in FIG. 5, this embodiment is based on the embodiment shown in FIG. 6, and further, the method in this embodiment may include:

Step S701. The terminal acquires feedback information of the second application program.

Step S702. The terminal sends the feedback information of the second application program to the server.

Step S703. The server receives the feedback information that is of the second application program and is sent by the terminal.

Step S704. The server updates the use rule and the use model according to the feedback information of the second application program.

In this embodiment, a specific implementation process of S701 to S704 is similar to a specific implementation process of S601 to S604 in the method embodiment of FIG. 6 of the present disclosure. For details, reference may be made to relevant records in the foregoing method embodiment of the present disclosure, and details are not described herein again.

In this embodiment, a terminal acquires feedback information of a recommended application program and sends the feedback information to a server, and the server updates the use rule and the use model according to the feedback information of the recommended application program. In this way, a to-be-recommended application program may be determined according to an updated use rule and use model, which further improves accuracy of predicting an application program.

Figure 8:
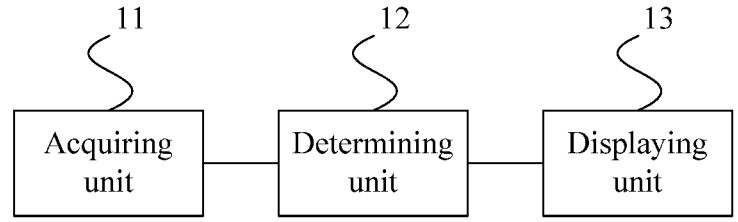
FIG. 8 is a schematic structural diagram of an embodiment of a terminal according to the present disclosure.

FIG. 8 is a schematic structural diagram of an embodiment of a terminal according to the present disclosure. The terminal is used for implementing the method shown in FIG. 1. As shown in FIG. 8, a terminal in this embodiment may include an acquiring unit 11, a determining unit 12, and a displaying unit 13. The acquiring unit 11 is configured to acquire current context information of the terminal and acquire an amount of context information generated when the terminal runs a first application program, where the first application program refers to an application program stored in the terminal. The determining unit 12 is configured to determine a to-be-used recommending mechanism according to the amount that is of the context information generated when the terminal runs the first application program and that is acquired by the acquiring unit 11, and determine, according to the to-be-used recommending mechanism, a second application program corresponding to the current context information acquired by the acquiring unit 11, where the second application program refers to a to-be-recommended application program. The displaying unit 13 is configured to display the second application program determined by the determining unit 12.

The terminal in this embodiment may be used to implement a technical solution in the method embodiment shown in FIG. 1, and implementation principles and technical effects thereof are similar and are not described herein again.

Figure 9:
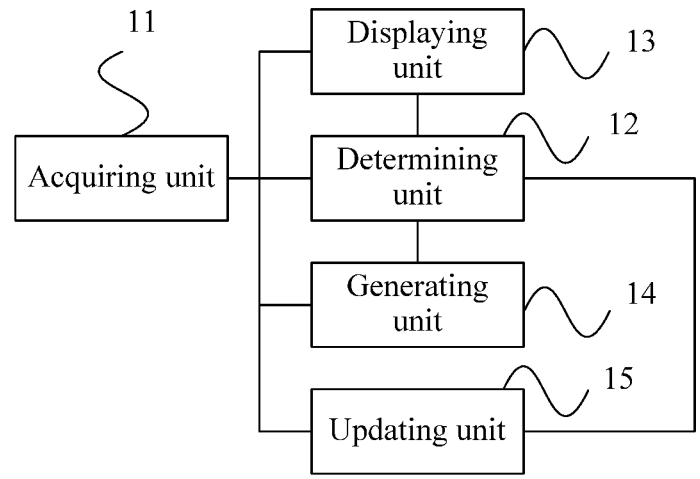
FIG. 9 is a schematic structural diagram of an embodiment of a terminal according to the present disclosure.

FIG. 9 is a schematic structural diagram of an embodiment of a terminal according to the present disclosure. The terminal is used for implementing the method shown in FIG. 2. As shown in FIG. 9, a terminal in this embodiment is based on the terminal structure shown in FIG. 8. Further, the recommending mechanism determined by the determining unit 12 includes at least one of a use rule and a use model. The determining unit 12 is configured to, if the amount that is of the context information generated when the terminal runs the first application program and that is acquired by the acquiring unit 11 is less than or equal to a first preset value, determine, according to the use rule, a to-be-recommended application program corresponding to the current context information acquired by the acquiring unit 11; if the amount that is of the context information generated when the terminal runs the first application program and that is acquired by the acquiring unit 11 is greater than or equal to a second preset value, determine, according to the use model, a to-be-recommended application program corresponding to the current context information acquired by the acquiring unit 11; and if the amount that is of the context information generated when the terminal runs the first application program and that is acquired by the acquiring unit 11 is greater than the first preset value and less than the second preset value, determine, according to the use rule and the use model, a to-be-recommended application program corresponding to the current context information acquired by the acquiring unit 11.

Further, the terminal in this embodiment may further include a generating unit 14, where the acquiring unit 11 is further configured to acquire the context information generated when the terminal runs the first application program; and the generating unit 14 is configured to generate the use rule and the use model according to the context information that is generated when the terminal runs the first application program and is acquired by the acquiring unit 11.

Optionally, the generating unit 14 is further configured to extract a context information characteristic value of the first application program according to the context information generated when the terminal runs the first application program; and generate the use rule and the use model according to the context information characteristic value of the first application program.

Optionally, the generating unit 14 is further configured to determine, according to the context information characteristic value of the first application program, a priority recommended for the second application program under a preset condition; use the priority recommended for the second application program under the preset condition as the use rule; and generate the use model according to the context information characteristic value of the first application program using a machine training method.

Optionally, the terminal in this embodiment further includes an updating unit 15, where the acquiring unit 11 is further configured to acquire feedback information of the second application program displayed by the displaying unit 13; and the updating unit 15 is configured to update the use rule and the use model according to the feedback information that is of the second application program and that is acquired by the acquiring unit 11.

Optionally, the feedback information includes use time and use duration.

The terminal in this embodiment may be used to implement a technical solution in the method embodiment shown in FIG. 2 or FIG. 3, and implementation principles and technical effects thereof are similar and are not described herein again.

Figure 10:
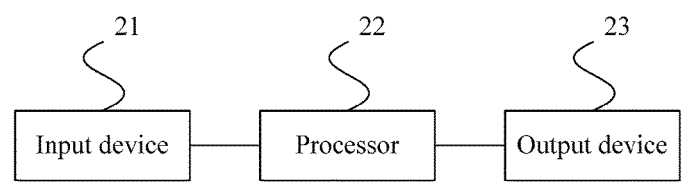
FIG. 10 is a schematic structural diagram of an embodiment of a terminal according to the present disclosure.

FIG. 10 is a schematic structural diagram of an embodiment of a terminal according to the present disclosure. The terminal is used for implementing the method shown in FIG. 3. As shown in FIG. 10, a terminal in this embodiment may include an input device 21, a processor 22, and an output device 23. The input device 21 is configured to acquire current context information of the terminal. The processor 22 is configured to acquire an amount of context information generated when the terminal runs a first application program, where the first application program refers to an application program stored in the terminal, determine a to-be-used recommending mechanism according to the amount of the context information generated when the terminal runs the first application program, and determine, according to the to-be-used recommending mechanism, a second application program corresponding to the current context information acquired by the input device 21, where the second application program refers to a to-be-recommended application program. The output device 23 is configured to display the second application program determined by the processor 22.

Optionally, the recommending mechanism determined by the processor 22 includes at least one of a use rule and a use model. The processor 22 is further configured to, if the amount of the context information generated when the terminal runs the first application program is less than or equal to a first preset value, determine, according to the use rule, a to-be-recommended application program corresponding to the current context information acquired by the input device 21; if the amount of the context information generated when the terminal runs the first application program is greater than or equal to a second preset value, determine, according to the use model, a to-be-recommended application program corresponding to the current context information acquired by the input device 21; and if the amount of the context information generated when the terminal runs the first application program is greater than the first preset value and less than the second preset value, determine, according to the use rule and the use model, a to-be-recommended application program corresponding to the current context information acquired by the input device 21.

Optionally, the input device 21 is further configured to acquire the context information generated when the terminal runs the first application program; and the processor 22 is further configured to generate the use rule and the use model according to the context information that is generated when the terminal runs the first application program and is acquired by the input device 21.

Optionally, the processor 22 is further configured to extract a context information characteristic value of the first application program according to the context information generated when the terminal runs the first application program; and generate the use rule and the use model according to the context information characteristic value of the first application program.

Optionally, the processor 22 is further configured to determine a priority recommended for the second application program under a preset condition according to the context information characteristic value of the first application program; use the priority recommended for the second application program under the preset condition as the use rule; and generate the use model according to the context information characteristic value of the first application program using a machine training method.

Optionally, the input device 21 is further configured to acquire feedback information of the second application program displayed by the output device 23; the processor 22 is further configured to update the use rule and the use model according to the feedback information that is of the second application program and that is acquired by the input device 21.

Optionally, the feedback information includes use time and use duration.

The terminal in this embodiment may be used to implement a technical solution in the method embodiment shown in any of FIG. 1 to FIG. 3, and implementation principles and technical effects thereof are similar and are not described herein again.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical characteristics thereof, without departing from the scope of the technical solutions of the embodiments of the present disclosure.

What is claimed is:

1. An application program recommending method, comprising:
    acquiring current context information of a terminal;
    acquiring first context information generated when the terminal executes a first application program stored in the terminal;
    extracting a context information characteristic value of the first application program from the first context information;
    generating a use rule and a use model based on the first context information and the context information characteristic value using a machine learning method;
    determining a recommending mechanism based on a quantity of times the first context information has been acquired;
    determining, according to the recommending mechanism, a second application program corresponding to the current context information; and
    displaying an indicator of the second application program on a display of the terminal, wherein the second application program is selected from a plurality of application programs installed on the terminal, and wherein the second application program is in an unlaunched state, the indicator selectable to launch the second application program,
    wherein the recommending mechanism comprises at least one of the use rule and the use model, and wherein determining, according to the recommending mechanism, the second application program comprises:
        determining the second application program further according to the use rule when the quantity of times the first context information has been collected is less than or equal to a first preset value;
        determining the second application program further according to the use model when the quantity of times the first context information has been collected is greater than or equal to a second preset value; and
        determining the second application program further according to the use rule and the use model when the quantity of times the first context information has been collected is greater than the first preset value and less than the second preset value,
    the method further comprising:
        acquiring feedback information of the second application program after displaying the second application program; and
        updating the use rule and the use model based on the feedback information.

2. The method of claim 1, wherein generating the use rule and the use model comprises:
    determining, based on the context information characteristic value, a recommended priority for the second application program under a preset condition;
    using the recommended priority as the use rule; and
    generating the use model based on the context information characteristic value of the first application program using the machine training method.

3. The method of claim 1, wherein the feedback information comprises use time and use duration.

4. A terminal, comprising:
    a display; and
    a processor in communication with the display, the processor configured to:
        acquire current context information of the terminal;
        acquire first context information generated when the terminal executes a first application program stored in the terminal;
        extract a context information characteristic value of the first application program from the first context information;
        generate a use rule and a use model based on the first context information and the context information characteristic value using a machine learning method;
        determine a recommending mechanism based on a quantity of times the first context information has been acquired, wherein the recommending mechanism comprises at least one of a use rule and a use model;
        determine a second application program according to the use rule and the current context information when the quantity of times the first context information has been collected is less than or equal to a first preset value;
        determine the second application program according to the use model and the current context information when the quantity of times the first context information has been collected is greater than or equal to a second preset value; and
        determine the second application program according to the use rule, the use model, and the current context information when the quantity of times the first context information has been collected is greater than the first preset value and less than the second preset value;

display an indicator of the second application program on the display, wherein the second application program is selected from a plurality of application programs installed on the terminal, and wherein the second application program is in an unlaunched state, the indicator selectable to launch the second application program;

acquire feedback information of the second application program after the displaying unit displayed the indicator of second application program; and update the use rule and the use model based on the feedback information.

5. The terminal of claim 4, wherein the processor is further configured to:

determine, based on the context information characteristic value, a recommended priority for the second application program under a preset condition;

use the recommended priority as the use rule; and generate the use model further based on the context information characteristic value of the first application program using the machine training method.

6. The terminal of claim 4, wherein the feedback information comprises use time and use duration.

7. An application program recommending method, comprising:

acquiring current context information of a terminal;

acquiring first context information generated when the terminal executes a first application program stored in the terminal;

determining a recommending mechanism based on a quantity of times the first context information has been acquired;

determining, according to the recommending mechanism, a second application program corresponding to the current context information; and displaying an indicator of the second application program on a display of the terminal, wherein the second application program is selected from a plurality of application programs installed on the terminal, and wherein the second application program is in an unlaunched state, the indicator selectable to launch the second application program, wherein the recommending mechanism comprises at least one of a use rule and a use model, and wherein determining, according to the recommending mechanism, the second application program comprises:

determining the second application program further according to the use rule when the quantity of times the first context information has been collected is less than or equal to a first preset value;

determining the second application program further according to the use model when the quantity of times the first context information has been collected is greater than or equal to a second preset value; and determining the second application program further according to the use rule and the use model when the quantity of times the first context information has been collected is greater than the first preset value and less than the second preset value, the method further comprising:

acquiring the first context information prior to determining the recommending mechanism; and generating the use rule and the use model based on the first context information, wherein generating the use rule and the use model comprises:

extracting a context information characteristic value of the first application program from the first context information; and generating the use rule and the use model further based on the context information characteristic value using a machine learning method.

8. The method of claim 7, wherein generating the use rule and the use model comprises:

determining, based on the context information characteristic value, a recommended priority for the second application program under a preset condition;

using the recommended priority as the use rule; and generating the use model based on the context information characteristic value of the first application program using a machine training method.

9. The method of claim 1, further comprising:

acquiring feedback information of the second application program after displaying the second application program; and updating the use rule and the use model based on the feedback information.

10. The method of claim 9, wherein the feedback information comprises use time and use duration.

* * * * *